G. E. WOLCOTT.
Riding-Plow.

No. 216,714.  Patented June 17, 1879.

WITNESSES:
Achilles Sehehl.
C. Sedgwick

INVENTOR:
G. E. Wolcott
BY Munn &Co
ATTORNEYS.

UNITED STATES PATENT OFFICE.

GIDEON E. WOLCOTT, OF DE KALB, ILLINOIS.

IMPROVEMENT IN RIDING-PLOWS.

Specification forming part of Letters Patent No. 216,714, dated June 17, 1879; application filed December 5, 1878.

*To all whom it may concern:*

Be it known that I, GIDEON EDWARD WOLCOTT, of De Kalb, in the county of De Kalb and State of Illinois, have invented a new and useful Improvement in Riding-Plows, of which the following is a specification.

Figure 1:
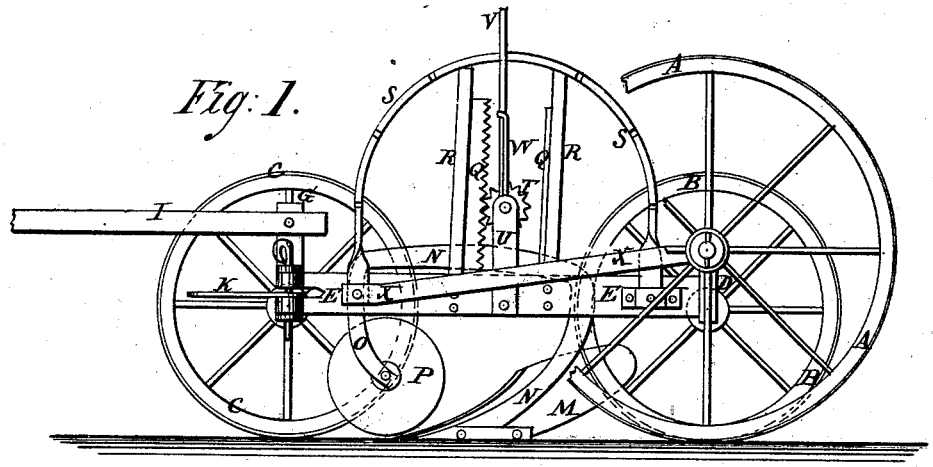
Figure 2:
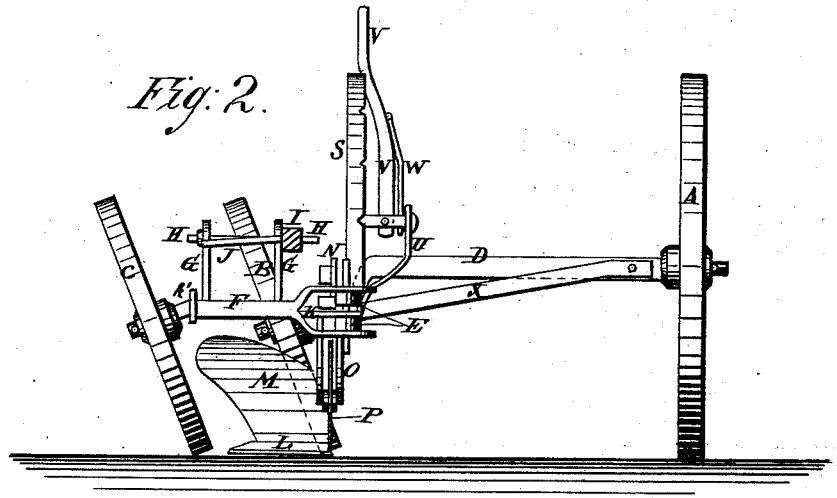
Figure 3:
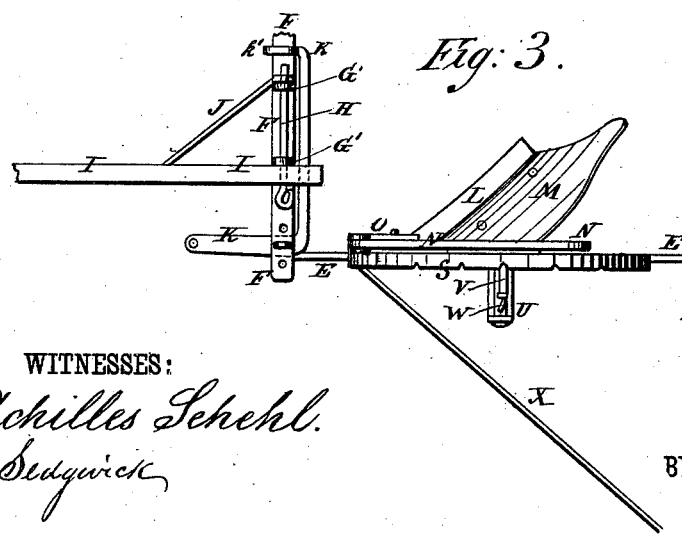

Figure 1 is a side view of my improved riding-plow, part being broken away to show the construction. Fig. 2 is a front view of the same, the tongue being shown in cross-section. Fig. 3 is a detail top view of a part of the same.

Similar letters of reference indicate corresponding parts.

The object of this invention is to furnish an improved riding-plow which shall be so constructed as to prevent the plow from pressing against the bottom and the land side of the furrow, greatly lightening the draft, which will cause the plow to cut a uniform furrow in all kinds of plowing, which will cause the plow to turn the last furrow, in finishing up a land, as evenly as any other furrow, which will bring the plow in front of the driver, so that he can see plow and team at the same time, and which can be conveniently raised from and lowered to the ground.

The invention consists in certain improvements, which will be first described in the specification, and then pointed out in the claims.

In the drawings, A represents the land-side wheel. B is the rear furrow-wheel, and C is the forward furrow-wheel. D is the rear or long axle, upon the journal at the land-side end of which revolves the land-side wheel A. The furrow-journal of the axle D is inclined downward, and upon it revolves the rear furrow-wheel, B. In the axle D is formed a downward shoulder or offset, which is made at such a distance from the furrow-journal that the rear furrow-wheel will roll along the angle between the bottom and the land side of the furrow in the rear of the plow. To the shoulder or offset of the axle D is rigidly attached the rear end of a bar, E, the forward end of which is hinged to the forked land-side end of the forward or short axle, F. Several holes are formed in the forked inner end of the short axle F, to receive the pivoting or hinging bolt, so that the plow may be adjusted to turn a wider or narrower furrow, as may be desired.

The journal of the axle F, upon which revolves the forward furrow-wheel, C, is so inclined downward, and the said axle F is made of such a length, that the said furrow-wheel C may roll along the angle between the bottom and the land side of the furrow in front of the plow. With this construction the two furrow-wheels B C will sustain the downward pressure of the plow toward the bottom of the furrow and the side pressure toward the land side of the furrow, and will thus cause the plow to run much lighter than when the downward and side pressures are directly against the bottom and the land side of the furrow.

To the forward axle, F, are rigidly attached two uprights, G, which have holes formed through their upper ends to receive the long bolt H. The inner end of the bolt H passes through the rear end of the tongue I, and its outer end passes through the rear end of the brace J, the forward end of which is attached to the tongue I.

K is the draw-bar, which is inserted in a slot in the forward end of the longitudinal bar E, and is pivoted to the said end by the bolt that hinges the bar E and the axle F to each other. The rear part of the draw-bar K is bent at right angles, extends along the rear side of the axle F, and has a hook, *k'*, formed upon its outer end, which hook *k'* is bent forward at right angles, and is hooked over the outer part of the axle F. With this construction the draw-bar K *k'* prevents the tongue I from whipping about and crowding toward the furrow.

L represents the point and share, M the mold-board, and N the beam, of a plow, which parts are made in the usual way.

The plow is made without any land-side, as there is no side pressure against the land side of the furrow.

To the forward part of the beam N is swiveled the upper end of the standard O, the lower part of which is curved and is slotted or forked, and to it is pivoted the rotary cutter P, in such a position that the said cutter may be directly over the land-side edge of the point L. To the beam N is rigidly attached the bend of a U-bar, Q, the outer edges of the arms of which slide up and down in grooves in the upright bars R. The lower ends of the upright bars R are rigidly attached to the bar E, and their upper ends are rigidly attached to the arched bar S. The ends of the arched bar S are rigidly attached to the end parts of the bar E.

In the inner edge of one of the arms of the U-bar Q are formed teeth, into which mesh the teeth of the gear-wheel T. The journal of the gear-wheel T revolves in bearings in the upper ends of the bars U, the lower ends of which are secured to the bar E midway between the lower ends of the grooved bars R. To the journal of the gear-wheel T is attached the end of the lever V, which projects across the notched edge of the arched bar S. The lever V is held against the notched edge of the arched bar S by the spring W, which is attached to the journal of the gear-wheel T.

With this construction, by operating the lever V, the plow can be raised conveniently from, lowered to, and adjusted to work at any desired depth in the ground, as may be desired, and will be held securely in any position into which it may be adjusted.

The connection between the rear or long axle, D, and the bar E is strengthened by the brace-bar X, the rear end of which is secured to the said axle D near its land-side end, and the forward end of which is secured to the said bar E near its forward end.

I am aware that two oblique furrow-wheels are not new; but

What I claim, and desire to secure by Letters Patent, is—

1. The plow-carriage formed of the rear or long axle, D, having an offset formed upon it, and having the journal at its furrow end inclined downward, the bar E, the forward or short axle, F, hinged to the forward end of the bar E, and having its journal inclined downward, the brace-bar X, the upright land-side wheel A, and the two inclined furrow-wheels B C, substantially as herein shown and described.

2. The draw-bar K, pivoted to the bolt that hinges the forward end of the bar E and the inner end of the forward or short axle, F, to each other, and having its rear part bent outward and provided with a hook, k', to hook upon the said axle F, substantially as herein shown and described.

GIDEON EDWARD WOLCOTT.

Witnesses:
AARON S. JACKSON,
GEORGE J. FLINN.